3,258,310
PROCESS FOR PRODUCING SILICA BY OXIDIZING SILICON TETRAHALIDES
Kenneth Arkless, Stockton-on-Tees, Durham, and John Dennis Herriman, Great Ayton, England, assignors to British Titan Products Company Limited, Durham, England, a corporation of the United Kingdom
No Drawing. Filed Mar. 13, 1962, Ser. No. 179,467
Claims priority, application Great Britain, Mar. 15, 1961, 9,564/61
6 Claims. (Cl. 23—182)

The present invention relates to a process for the production of finely divided silicon dioxide and, in particular, to the production of silicon dioxide by the vapour phase oxidation of a silicon tetrahalide in a fluidized bed reactor.

Finely divided silicon dioxide is used as a filler and in the reinforcing of natural and synthetic rubbers, in the manufacture of cosmetics, and as a thickening agent for liquids.

In our British specifications Nos. 796,735 and 6,987/58, processes are described and claimed for the production of silican dioxide by the vapour phase oxidation of silicon tetrachloride in a fluidized bed of inert particulate material. These processes can be carried out in such a manner as to retain sufficient heat of reaction in the bed to allow the process to proceed autothermally.

It is an object of the present invention, however, to provide a process wherein a substantial proportion of the oxidation reaction takes place above the bed as it has been discovered that this yields a finely-divided silicon dioxide of improved quality with respect to that produced by the earlier fluidized bed techniques. For example, one can obtain a greater specific surface area and a more uniform particle size in the silicon dioxide product.

Accordingly, the present invention provides a process for the production of silicon dioxide, comprising oxidizing a vaporized silicon tetrahalide in a hot fluidized bed of inert particulate material, maintaining the height of the bed and the rate of flow of one or more of the reactants at such a value that only part of the overall oxidation reaction takes place within the bed and the reaction continues above the bed and thereafter recovering the silicon dioxide so produced.

The term "oxidation reaction" is used herein to designate only the oxidation of silicon halide and does not include oxidation of any fuel such as will be described hereinbelow.

It is believed that the overall oxidation reaction may in fact be in two stages, firstly the silicon tetrahalide is partially oxidized to form silicon oxyhalide and, secondly, the latter is oxidized to silicon dioxide. It is preferred that as much as possible, if not all, of the second stage be effected above the bed, since silica produced above the bed has the aforesaid advantages over silica produced in the bed. Generally, one should ensure that at least 15%, preferably at least 50%, of the overall reaction is carried out above the bed, that is, less than 85% and preferably less than 50% of the stoichiometric oxygen content of silicon dioxide is combined with silicon within the bed.

The oxidation will normally be effected by means of oxygen gas. The oxygen used may be a commercially pure gas or it may be in the form of free oxygen contained in an inert gas, for example air. If such latter mixture be used the halogen produced during the reaction will be diluted with the inert gas and recovery of this halogen may be made more difficult.

The amount of reaction which does take place within the bed will generally be insufficient to maintain autothermal conditions, and in such a case extra heat may be applied to maintain reaction temperatures. This extra heat may be provided by fuel introduced into and burnt in the reactor or by an external source. Fuel added to the bed may be either a solid fuel, for example carbon or coke of particle size similar to that of the bed material, or a fuel gas, for example, carbon monoxide. Such fuel may react with excess oxygen in the bed. If heat is supplied from an external source, this may comprise the preheating of at least one of the reactant gases before introduction into the bed, a furnace surrounding the reactor, or heating coils in the bed. Of course, the use of such furnace or heating coils may cause difficulties if materials which are thin enough to effect rapid heat transfer and yet sufficiently resistant to the conditions of the reaction, are not readily available.

The silicon tetrahalide used in this process is preferably silicon tetrachloride, although the tetraiodide or tetrabromide may be used, if available. The tetrafluoride is not suitable for use in the process and the term "tetrahalide" as used in this specification does not include the tetrafluoride.

The control of the present invention may be achieved by reducing the height of the bed at a given flow rate of reactants until the height of the bed is insufficient to allow the oxidation reaction to be completed in the bed. Alternatively, with a bed of given height the effective flow rate of one or more of the reactants may be increased until the residence time, i.e., the time the reactants remain in the bed, is insufficient to allow the reaction to be completed in the bed.

The effective flow rate may be increased, either by increasing the flow rate of one or more of the reactants, or by introducing into the bed a gaseous diluent which increases the rate at which the reactants are swept through the bed. Such a diluent may be, for example, nitrogen, chlorine, or recycled effluent gas from which the silicon dioxide has been removed. The recycled effluent gas may contain chlorine, oxygen, and any inert diluent gas. It may also contain carbon dioxide, if carbon was burnt as a fuel in the bed.

The gases emerging from the top of the bed must of course be at least at the necessary temperature to permit or complete the formation of silicon dioxide. The residence time must be adjusted with this factor in mind.

The silicon tetrahalide is normally vaporized by being heated before introduction into the fluidized bed, and it may be introduced into the bed in an inert carrier gas, or in a fuel gas, if desired.

The bed of particulate material should consist, of course, of particles of such size that they can be fluidized at the rate of flow of the gases it is desired to pass through the bed. Examples of suitable material for the bed are silica, alumina, zircon and rutile. Silica and zircon are preferred. The particles may suitably have diameter within the range of 40–1,000 microns, preferably 76–250 microns, such as characterizes the particle size of a sand.

The temperature of the bed during the operation of the process should suitably be maintained within the range of 500° C. to 1200° C., preferably within the range of 700° C. to 1100° C.

In the event that one has to supply extra heat as described above, for maintaining the required reaction temperature in the bed, the extra heat added to maintain the bed temperature at the desired value allows one to estimate how much of the reaction is taking place in the bed and how much above the bed.

The following example illustrates the process of the invention.

*Example*

A shaft reactor was used comprising a steel shell enclosing a furnace having an internal diameter of 18 inches and an overall height of 10 feet. The furnace was lined with chlorine-resistant refractory concrete 3 inches thick and insulating brickwork 12 inches thick. An opening of 6 inches diameter was provided in the wall of the furnace at a distance 1 foot from the top. The purpose of this opening was to permit removal of the reaction products. This opening was connected to equipment for cooling and collecting the reaction products.

The base of the reactor was sealed by a perforated plate supporting a block of chlorine-resistant concrete. 21 passages distributed uniformly, each having an aperture at the lower end of diameter 0.08 inch, were provided through the perforated plate and concrete block. A number of small ports were distributed along the side wall of the furnace for the insertion of thermocouples, gas sampling tubes and fuel injection ports.

Silica sand of average particle diameter 170 microns was fed into the open top of the furnace to form a bed which, when fluidized, had a depth of approximately 14 inches. The bed was fluidized by air delivered through the perforated base plate and was preheated to a temperature of 1150° C. by a gas poker inserted through the top of the furnace. At this temperature the gas poker was removed and the top of the furnace sealed by means of an insulated plate.

When the bed temperature had fallen to 1030° C. the air feed was replaced by a premixed feed of oxygen and vaporized silicon tetrachloride. The components of this premixed feed were metered separately at 220 liters of oxygen per minute (N.T.P.) and 0.65 liter of liquid silicon tetrachloride per minute, before mixing. The mixture was maintained at 100° C. to avoid condensation of silicon tetrachloride in the lines leading to the distribution plate. Simultaneously, petroleum coke of average particle size 200 microns, metered by a vibrating feeder, was injected into the bed using oxygen as the entraining gas; this oxygen was metered at 24 liters per minute (N.T.P.).

This process was continued for a period of five hours, during the initial stages of which it was found that a coke feed of only 12 grams per minute was required to maintain the desired bed temperature of 1015° C., instead of 26 grams per minute which is the theoretical amount (assuming no oxidation reaction in the bed) required to maintain the bed temperature of 1015° C. The temperature at a point approximately 9 inches above the bed surface remained consistently in the range 1110° C. to 1140° C. during the process, indicating that a highly exothermic reaction was occurring at this level above the bed.

That the reaction was taking place partly in the bed and partly above the bed was shown by sampling the gases immediately above the bed surface. No silicon dioxide was found in such a sample, and, when the sample was condensed to a liquid, analysis of the liquid showed it to be deficient in chlorine when compared with the theoretical composition of silican tetrachloride. This was believed to indicate the initial intermediate production of silicon oxychloride in the bed. The gas analysis also indicated that all the coke was burnt within the bed to form carbon dioxide.

The product obtained from the collecting equipment, when analyzed, was found to consist of pure silicon dioxide, indicating that the oxidation had been completed above the bed.

The product of the process was very voluminous amorphous white silica having a particle diameter in the narrow range 0.006 to 0.008 micron and a specific surface area of 350 square meters per gram.

As a contrast to the above example, the product from a similar process, in which the bed height and flow rate of the reactants was such that the oxidation reaction took place substantially completely in the bed, had a specific surface area of only 260 square meters per gram. The particle diameters of such product varied much more widely than those of the product produced as described in the foregoing example.

What we claim is:

1. A process for the production of finely divided amorphous white silica comprising the steps of:
   (a) providing a hot fluidized bed of inert particulate material,
   (b) introducing oxygen and a vaporized silicon tetrahalide selected from the group consisting of silicon tetrachloride, silicon tetraiodide and silicon tetrabromide into said fluidized bed,
   (c) reacting said silicon tetrahalide and said oxygen in said bed to form silicon oxyhalides therein,
   (d) introducing into said fluidized bed and oxidizing therein sufficient carbonaceous reducing agent to maintain in the bed a temperature of at least 700° C.,
   (e) maintaining the height of said bed and the flow rate of reactants into said bed at values preventing more than 85% of the stoichiometric oxygen content of silicon dioxide from combining with the silicon values in said bed, and insuring that at least 15% of the overall oxidation reaction is effected above the bed, and
   (f) oxidizing said silicon oxyhalides to silicon dioxide above said bed and recovering the finely divided silicon dioxide so formed.

2. A process in accordance with claim 1 in which said silicon tetrahalide is silicon tetrachloride.

3. A process in accordance with claim 2 in which said bed is maintained at a temperature in the range of 700° C. to 1100° C.

4. A method in accordance with claim 1 in which finely divided coke is introduced into said fluidized bed and oxidized therein.

5. A method in accordance with claim 2 in which finely divided coke is introduced into said fluidized bed and oxidized therein.

6. A method in accordance with claim 3 in which finely divided coke is introduced into said fluidized bed and oxidized therein.

References Cited by the Examiner
UNITED STATES PATENTS

| | | | |
|---|---|---|---|
| 2,760,846 | 8/1956 | Richmond et al. | 23—202 |
| 2,823,982 | 2/1958 | Saladin et al. | 23—202 |
| 2,828,187 | 3/1958 | Evans et al. | 23—202 |
| 3,043,660 | 7/1962 | Hughes et al. | 23—182 |
| 3,105,742 | 10/1963 | Allen et al. | 23—202 |

OSCAR R. VERTIZ, *Primary Examiner.*

MAURICE A. BRINDISI, *Examiner.*

H. T. CARTER, *Assistant Examiner.*